(12) United States Patent
Omatsu

(10) Patent No.: US 8,536,270 B2
(45) Date of Patent: Sep. 17, 2013

(54) RESIST COMPOSITION, RESIST LAYER, IMPRINTING METHOD, PATTERN FORMATION, METHOD FOR PRODUCING MAGNETIC RECORDING MEDIUM, AND MAGNETIC RECORDING MEDIUM

(75) Inventor: Tadashi Omatsu, Kanagawa (JP)

(73) Assignee: FujiFilm, Tokyo (JP)

(*) Notice: Subject to any disclaimer, the term of this patent is extended or adjusted under 35 U.S.C. 154(b) by 532 days.

(21) Appl. No.: 12/731,308

(22) Filed: Mar. 25, 2010

(65) Prior Publication Data

US 2010/0247970 A1 Sep. 30, 2010

(30) Foreign Application Priority Data

Mar. 26, 2009 (JP) ................. 2009-077787

(51) Int. Cl.
C08F 214/06 (2006.01)
B44C 1/22 (2006.01)
B28B 11/08 (2006.01)

(52) U.S. Cl.
USPC .......... 524/851; 216/22; 216/44; 216/49; 427/128; 264/293

(58) Field of Classification Search
None
See application file for complete search history.

(56) References Cited

U.S. PATENT DOCUMENTS

| 8,163,813 B2 | 4/2012 | Kawaguchi et al. |
| 2008/0107870 A1 | 5/2008 | Kawaguchi et al. |
| 2008/0248425 A1* | 10/2008 | Nishiyama et al. ........ 430/285.1 |
| 2012/0175821 A1 | 7/2012 | Kawaguchi et al. |

FOREIGN PATENT DOCUMENTS

| JP | 2005-053997 | 3/2005 |
| JP | 2005-159358 | 6/2005 |
| JP | 2006-080447 | 3/2006 |
| JP | 2006-310566 | 11/2006 |
| WO | 2006/114958 | 11/2006 |
| WO | 2008/155928 | 12/2008 |

OTHER PUBLICATIONS

English Abstract of JP 2008-202022, Kawabe et al., Sep. 2008, Japan.*
Japanese Official Action—2010-066678—Jul. 16, 2013.

* cited by examiner

Primary Examiner — Holly Rickman
(74) Attorney, Agent, or Firm — Young & Thompson

(57) ABSTRACT

To provide a resist composition including: at least one polymerizable compound having a viscosity of 100 mPa·s or less at 25° C.; a fluorine-containing compound A having a viscosity of 5,000 mPa·s or greater at 25° C., and a fluorine content of 10% by mass or greater; and a fluorine-containing compound B having a viscosity of 2,000 mPa·s or less at 25° C., and a fluorine content of 10% by mass or greater.

8 Claims, 3 Drawing Sheets

RESIST COMPOSITION, RESIST LAYER, IMPRINTING METHOD, PATTERN FORMATION, METHOD FOR PRODUCING MAGNETIC RECORDING MEDIUM, AND MAGNETIC RECORDING MEDIUM

BACKGROUND OF THE INVENTION

1. Field of the Invention

The present invention relates to a resist composition which includes a fluorine-containing compound, a resist layer, an imprinting method, a pattern formation, a method for producing a magnetic recording medium, and a magnetic recording medium.

2. Description of the Related Art

In the field of storage media, much is expected from patterned media as a means for further improving performance.

Production methods of patterned media have been a problem, and methods utilizing nanoimprinting are regarded as popular in terms of fine shaping capability and productivity and are being examined in various ways.

Nanoimprinting is expected to be a method for securing a favorable balance between fine shaping capability and productivity.

It is presumed that nanoimprinting will be widely applied to the fields of semiconductors, devices, hard disks, optical films and so forth.

Especially in the fields of semiconductors and patterned media, for the purpose of further improving performance, nanoimprinting is highly expected to be utilized for patterning related to a region having a line width of 100 nm or less and a pattern aspect ratio of 2 or greater.

Also in these fields, since a surface on the side of a substrate is shaped by etching, using a formed pattern as a resist, in a step subsequent to pattern formation, it is necessary to reduce the thickness of a residual film formed, which is equivalent to the distance between the bottom of concave portions of the nanoimprint pattern and the substrate, for the purpose of further improving processing accuracy.

Further, it is necessary to achieve in-plane uniformity in the fine shaping, with respect to the entire imprint surface.

FIGS. 3A to 3C are schematic drawings exemplarily showing a conventional imprinting method which includes steps for forming a resist layer 102 (resist pattern) on a substrate 103 made of a material selected according to the purpose.

Firstly, a resist composition is applied onto the substrate 103 and then subjected to spin coating with a general-purpose spin coater (not shown) so as to form the resist layer 102. Secondly, a mold structure 110 on which a pattern for imprinting is formed is placed against the side of the resist layer 102 (see FIG. 3A). In this state, the mold structure 110 is pressed against the resist layer 102 so as to pattern the resist layer 102, with the pattern of the mold structure 110 serving as a template, then the mold structure 110 is separated from the resist layer 102 (see FIG. 3B). Thus, a resist pattern (resist layer 102) is formed on the substrate 103. At this time, a thin film of the resist layer 102 remains as a residual film 104 in gaps formed between convex portions of the mold structure and the substrate 103 with the resist layer 102 thereon (see FIG. 3C).

Various techniques for forming minute patterns in a highly productive manner have been proposed. For instance, there has been proposed a technique of making a fluorine-based compound present in a localized manner at the outermost surface of a resist layer and thus reducing adhesion or fixation of the resist to a mold structure, thereby improving patterning quality (refer to Japanese Patent Application Laid-Open (JP-A) Nos. 2005-159358 and 2006-310566).

Meanwhile, there has been proposed a technique of providing a layer (5 nm or less in thickness) of a fluorine compound on the surface of a resist so as to improve separability (refer to JP-A No. 2006-80447).

However, application of the technique to a minute pattern is difficult regarding the former example; and a pattern superior in minute shape can be obtained, but it is difficult to sufficiently reduce the thickness of a residual film owing to the viscosity of the resist composition regarding the latter example. Consequently, it is difficult to form an imprint pattern uniformly and with a small residual film thickness on the entire surface of a wide pattern area such as a HDD and thus to obtain a pattern with a uniform shape.

BRIEF SUMMARY OF THE INVENTION

The present invention is aimed at solving the problems in related art and achieving the following object. An object of the present invention is to provide a resist composition, a resist layer, an imprinting method, a pattern formation and techniques related to these, that are superior in coatability, imprinting quality and minute shape, capable of obtaining favorable uniformity of a residual film, and thus capable of obtaining a uniform patterned shape, and further, improving productivity by a reduction in the length of time for mold separation.

With regard to the object, when an attempt was made to form a pattern having a line width of 100 nm or less and an aspect ratio of 2 or greater, such that the residual film would be thin, using the method described in JP-A Nos. 2005-159358 and 2006-310566, the following problem was found: pattern defects such as tearing of the pattern and peeling off of the pattern from the surface of a substrate occurred when a mold structure was separated from a resist after the formation of the pattern, and thus the pattern could not be stably formed on the entire imprint surface. This problem was particularly noticeable when the line width was 50 nm or less, the aspect ratio was 3 or greater, and the residual film was thin. It was further confirmed that the problem was even more noticeable when the mold structure was separated in a short period of time in view of productivity.

Meanwhile, when an attempt was made to imprint a pattern having a line width of 100 nm or less and an aspect ratio of 2 or greater, such that the residual film would be thin, using the technique described in JP-A No. 2006-80447, the following problem was found: since a thermoplastic resin was used as a resist layer, it was impossible to form a pattern which could satisfy these conditions.

Also, when application of the technique for providing the layer (5 nm or less in thickness) of the fluorine compound, described in JP-A No. 2006-80447, to a resist composition for UV imprinting, that included a UV-curable monomer was considered, the following problem was found: in the case where the monomer had a low viscosity, it was difficult to form a resist layer with a general-purpose spin coater such that the layer thickness distribution was uniform.

Moreover, the following problem was found: in a region where the layer containing the fluorine compound was formed thickly and with a nonuniform thickness, the surplus fluorine compound caused the surface of the resist layer to have a granular shape, and thus a patterned shape formed after the shaping of a substrate as a subsequent step corresponded with the nonuniform layer thickness distribution and so deviated from a desired shape. Also, there was such a problem found that the granular shape remained on the resist layer.

As a result of carrying out earnest examinations in an attempt to achieve the above-mentioned object, the present inventors have found that even when a resist composition is composed mainly of a low-viscosity polymerizable compound, use of a combination of a fluorine-containing compound having a viscosity of 5,000 mPa·s or greater and a fluorine-containing compound having a viscosity of 2,000 mPa·s or less in the resist composition makes it possible to obtain favorable uniformity of a residual film and thus to obtain a uniform patterned shape.

Also, they have found that the inclusion of the fluorine-containing compound having a viscosity of 5,000 mPa·s or greater makes it possible to obtain favorable coatability, and the inclusion of the fluorine-containing compound having a viscosity of 2,000 mPa·s or less makes it possible to obtain favorable imprinting quality.

The present invention is based upon the above-mentioned findings of the present inventors, and means for solving the problems are as follows.

<1> A resist composition including: at least one polymerizable compound having a viscosity of 100 mPa·s or less at 25° C.; a fluorine-containing compound A having a viscosity of 5,000 mPa·s or greater at 25° C., and a fluorine content of 10% by mass or greater; and a fluorine-containing compound B having a viscosity of 2,000 mPa·s or less at 25° C., and a fluorine content of 10% by mass or greater.

<2> A resist layer including the fluorine-containing compound A and the fluorine-containing compound B in a surface layer region of the resist layer which lies from a surface of the resist layer to a depth of 2.4 nm or less from the surface, wherein the resist layer is formed by applying the resist composition according to <1>.

<3> The resist layer according to <2>, wherein the surface layer region lies from the surface of the resist layer to a depth of 0.5 nm to 2.0 nm from the surface.

<4> The resist layer according to <2> or <3>, wherein X and Y measured by a method using etching and ESCA satisfy the relationship Y/X≧0.99, where X denotes the total amount, expressed as % by mass, of the fluorine-containing compound A and the fluorine-containing compound B contained in the resist layer, and Y denotes the amount, expressed as % by mass, of the fluorine-containing compound A and the fluorine-containing compound B present in the surface layer region of the resist layer.

<5> An imprinting method including pressing an imprint mold, which has a patterned shape, against the resist layer according to any one of <2> to <4> from the side of the surface layer region of the resist layer so as to imprint the resist layer with a resist pattern made by transferring the patterned shape as a template.

<6> A pattern formation including a patterned shape formed by performing etching, using as a mask a resist pattern formed by the imprinting method according to <5>.

<7> A method for producing a magnetic recording medium, including: forming the resist layer according to any one of <2> to <4> over a substrate and pressing an imprint mold, which has a patterned shape, against the resist layer from the side of the surface layer region of the resist layer so as to imprint the resist layer with a resist pattern made by transferring the patterned shape as a template; and performing etching, using as a mask the resist pattern formed by the imprinting, so as to form a pattern at a magnetic layer.

<8> A magnetic recording medium including: a substrate; and a magnetic layer patterned by the method according to <7>.

According to the present invention, it is possible to solve the problems in related art and achieve the object of providing a resist composition, a resist layer, an imprinting method, a pattern formation and techniques related to these, that are capable of preventing, on the entire surface of a pattern formation, the occurrence of separation-related defects and pattern defects, making uniform a patterned shape and a residual film, and improving productivity by shortening the length of time for mold separation.

DETAILED DESCRIPTION OF THE INVENTION

Figure 1A:
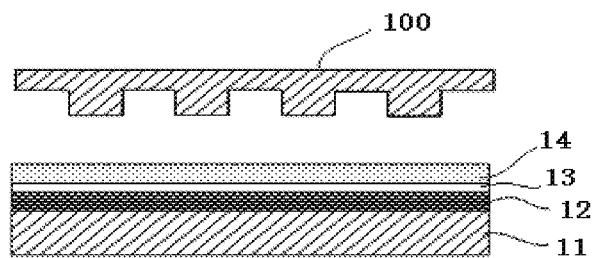
FIG. 1A is a process drawing (1) showing an example of a method for producing a magnetic recording medium of the present invention.

The following explains a resist composition, a resist layer, a pattern formation, a method for producing a magnetic recording medium, and a magnetic recording medium according to the present invention.

(Resist Composition)

The resist composition includes at least one polymerizable compound, a fluorine-containing compound A, and a fluorine-containing compound B and, if necessary, includes other component(s).

The resist composition can be suitably used as a resist composition for nanoimprinting.

As to the resist composition's suitability for minute shaping, the resist composition preferably has suitability for patterning with a line width of 100 nm or less, more preferably suitability for patterning with a line width of 50 nm or less.

The aspect ratio of a convex portion of a resist pattern formed of the resist composition is preferably two or greater, more preferably three or greater.

Also, the thickness of a residual film present at concave portions between convex portions of the resist pattern when the resist pattern is formed is preferably 20 nm or less, more preferably 10 nm or less.

In the present specification, the term "nanoimprinting" means imprinting the pattern having a line width of 100 nm or less and an aspect ratio of two or greater, such that the thickness of the residual film is 20 nm or less.

Further, the resist composition is superior in uniformity on the entire surface regarding the stability of pattern formation and also in separability from a mold structure, thereby yielding superior productivity.

<Polymerizable Compound>

The polymerizable compound is not particularly limited and may be suitably selected according to the purpose, and the polymerizable compound may be any one of a photocurable resin composition, a thermosetting resin composition and a thermoplastic resin composition but is preferably a photocurable resin composition.

The photocurable resin composition can, for example, be widely used in photo nanoimprint lithography in which, before cured, the photocurable resin composition has high light transmittance and is superior in formability of a minute concavo-convex pattern, coating suitability and other processing suitability and, after cured, the photocurable resin composition yields comprehensively superior coating properties in terms of sensitivity (rapid curability), resolution, line edge roughness, coating film strength, separability from a mold structure, residual film property, etching resistance, low cure shrinkage, adhesion to a substrate, and so forth.

To further enhance etching resistance, it is preferable to increase the reaction rate after polymerization, and use of any of the after-mentioned (meth)acrylate-based polymerizable compounds, which are polymerizable compounds high in polymerization rate after reaction, is particularly preferable.

Also, the polymerizable compound is preferably composed of polymerizable unsaturated monomer(s). Further, in view of shaping by etching, the polymerizable compound preferably has a structure resistant to etching.

In addition, the polymerizable compound preferably has a structure which contains polar group(s).

With the polar group(s), coatability improves due to improvement in affinity for a substrate, and the occurrence of pattern defects such as peeling off of a pattern in a mold separating step subsequent to imprinting can be suppressed due to improvement in adhesion to the substrate, so that the quality of the pattern obtained after the imprinting and productivity improve.

Preferred examples of the polar group(s) include —CN, —$OR^1$, —$CO_2R^1$, —$SR^1$, —$NR^1R^2$, —$NR^1CO$—, ($R^1$ and $R^2$ each denote a hydrogen atom, or a hydrocarbon group which has one or more carbon atoms and which contains or does not contain a modifying group. Also, $R^1$ and $R^2$ may be the same or different), —NHCOO— and —NHCONH—.

The upper limit of the viscosity of the polymerizable compound is 100 mPa·s or less, preferably 40 mPa·s or less, even more preferably 20 mPa·s or less.

When it is 100 mPa·s or less, the pattern formability of the resist composition which includes the polymerizable compound as a main component, with respect to a minute pattern having a line width of 100 nm or less, can be improved in imprinting. Also, the lower the viscosity is, the better the pattern formability can be.

The lower limit of the viscosity of the polymerizable compound is preferably 0.1 mPa·s or greater. When it is less than 0.1 mPa·s, coatability may degrade.

The polymerizable compound preferably has a low molecular weight in view of achieving the reduction in viscosity.

The molecular weight (Mw) of the polymerizable compound is not particularly limited; however, it is preferably 3,000 or less, more preferably 1,500 or less.

The crosslink density in a resist layer of the polymerizable compound is preferably high in view of enabling formation of a resist pattern with a high aspect ratio; specifically, Relationship (1) below is preferably satisfied.

Mw/Number of polymerizable group(s)≦150  Relationship (1)

In Relationship (1), Mw denotes the molecular weight of the polymerizable compound, and "number of polymerizable group(s)" denotes the number of polymerizable group(s) contained in the polymerizable compound.

The polymerizable unsaturated monomer(s) may be suitably selected from monofunctional polymerizable unsaturated monomers each containing in its molecule a site which includes at least one of a site containing an ethylene-based unsaturated bond, and a heteroatom (e.g. oxygen atom, nitrogen atom or sulfur atom).

Examples of the polymerizable unsaturated monomer(s) include those disclosed in JP-A No. 2008-202022.

Suitable examples of the polymerizable unsaturated monomer(s) include a polymerizable unsaturated monomer which has one to six groups each containing the ethylene-based unsaturated bond (monofunctional to hexafunctional polymerizable unsaturated monomer).

Firstly, as the polymerizable unsaturated monomer which has one group containing the ethylene-based unsaturated bond (monofunctional polymerizable unsaturated monomer), a/an (meth)acrylate having a aromatic group or alicyclic hydrocarbon group is preferable in terms of dry etching resistance. Examples thereof which can be suitably used in the present invention include benzyl (meth)acrylate, 1- or 2-naphthyl (meth)acrylate, 1- or 2-naphthylmethyl (meth)acrylate, dicyclopentanyl (meth)acrylate, dicyclopentanyloxyethyl (meth)acrylate, isobornyl (meth)acrylate and adamantyl (meth)acrylate; in particular, a/an (meth)acrylate having a naphthalene structure is preferable because of its superiority in terms of line edge roughness after dry etching.

Preferred examples of other polymerizable monomers include polyfunctional polymerizable unsaturated monomers each having two or more groups containing ethylene-based unsaturated bonds.

Among these, neopentyl glycol di(meth)acrylate, 1,9-nonanediol di(meth)acrylate, tripropylene glycol di(meth)acrylate, tetraethylene glycol di(meth)acrylate, neopentyl glycol hydroxypivalate di(meth)acrylate, polyethylene glycol di(meth)acrylate and so forth can be suitably used in the present invention.

The above-mentioned other polymerizable monomers may be suitably selected from compounds expressed as the following polymerizable monomers (Ax).

—Polymerizable Monomers (Ax)—

The polymerizable monomers (Ax) are represented by General Formula (A) below.

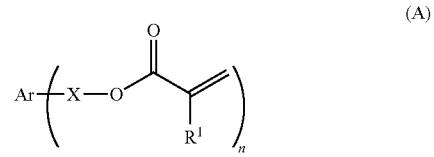

(A)

(In General Formula (A), Ar denotes an arylene group which may contain a substituent, X denotes a single bond or an organic linking group, $R^1$ denotes a hydrogen atom or a methyl group, and n denotes an integer of 2 or 3.)

In General Formula (A), examples of the arylene group include hydrocarbon arylene groups such as phenylene group and naphthylene group; and heteroarylene groups with indole, carbazole, etc. serving as linking groups. Among these, hydrocarbon arylene groups are preferable, and phenylene group is particularly preferable in terms of viscosity and etching resistance. The arylene group may contain a substituent, preferred examples of which include alkyl groups, alkoxy groups, hydroxyl group, cyano group, alkoxycarbonyl groups, amide groups and sulfonamide groups.

Examples of the organic linking group represented by X include alkylene groups, arylene groups and aralkylene groups, each of which may contain a heteroatom in its chain. Among these, alkylene groups and oxyalkylene groups are preferable, particularly alkylene groups. The symbol X is particularly preferably a single bond or an alkylene group.

$R^1$ denotes a hydrogen atom or a methyl group, preferably a hydrogen atom.

The symbol n denotes an integer of 2 or 3, preferably 2.

It is desirable in terms of lowering the viscosity of the composition that the polymerizable monomers (Ax) be polymerizable monomers represented by General Formula (A-a) or (A-b) below.

General Formula (A-a)

General Formula (A-b)

(In General Formulae (A-a) and (A-b), $X^1$ and $X^2$ each independently denote a single bond or an alkylene group which may contain a substituent having one to three carbon atoms, and $R^1$ denotes a hydrogen atom or a methyl group.)

In General Formula (A-a), $X^1$ is preferably a single bond or a methylene group, particularly a methylene group in view of a reduction in viscosity.

Preferred limits for $X^2$ are similar to those for $X^1$.

The definition of $R^1$ in General Formulae (A-a) and (A-b) is the same as that of $R^1$ in General Formula (A), and preferred limits for the former $R^1$ are similar to those for the latter $R^1$.

It is desirable that the polymerizable monomers (Ax) be liquid at 25° C. because generation of foreign matter can be suppressed even when they are added in increased amounts.

Preferred specific examples of the polymerizable monomers (Ax) are shown below. The symbol $R^1$ in the structural formulae below, the definition of which is the same as that of $R^1$ in General Formula (A), denotes a hydrogen atom or a methyl group. It should, however, be noted that the polymerizable monomers (Ax) mentioned in the present invention are not limited to these specific examples.

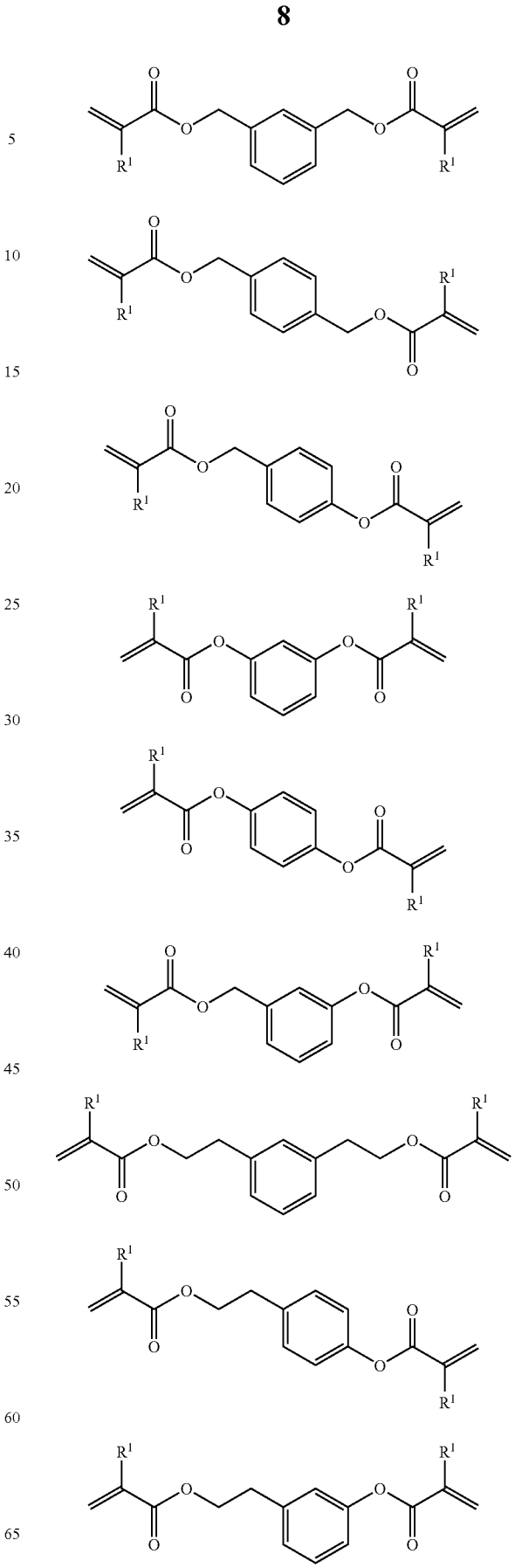

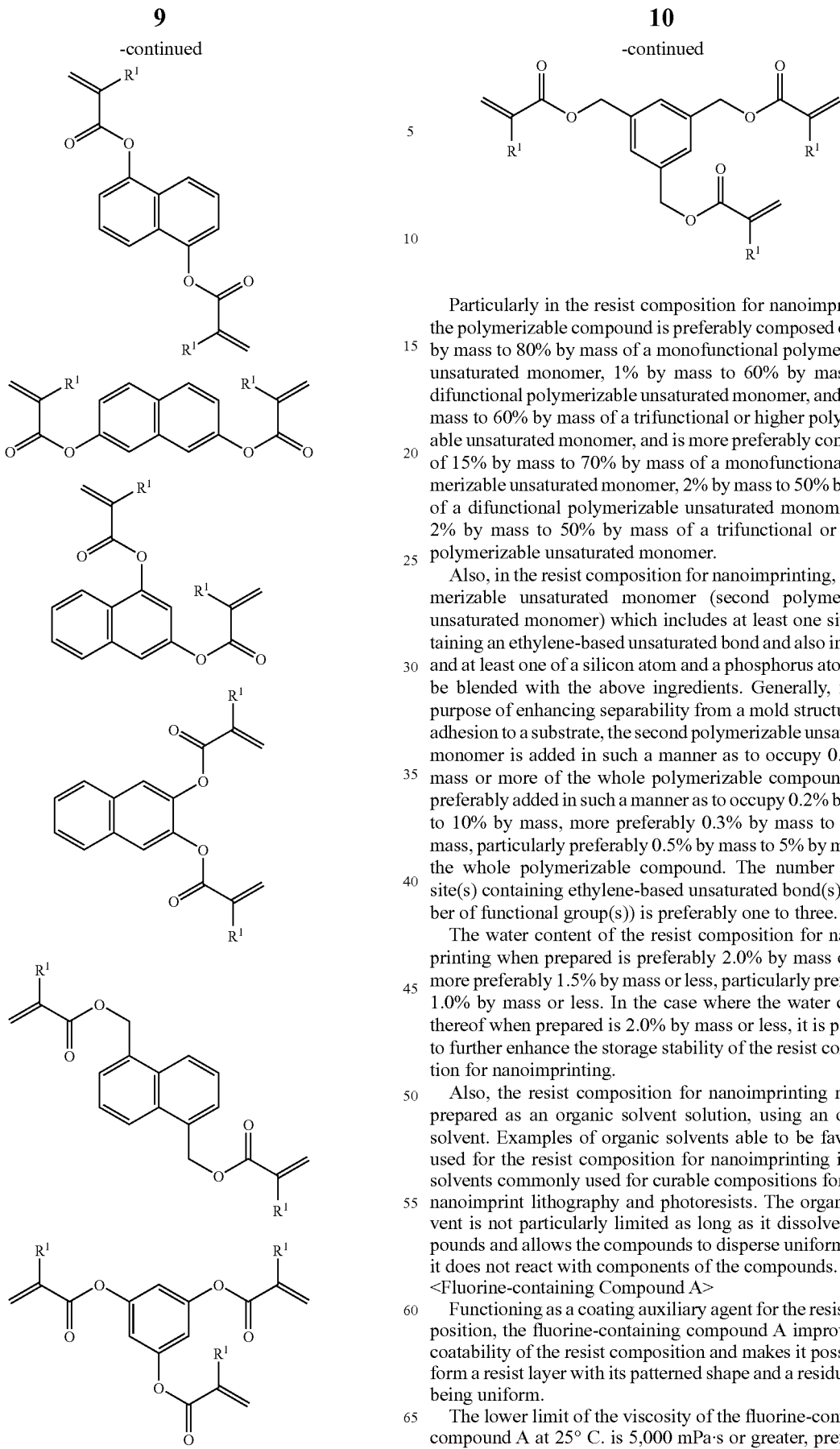

Particularly in the resist composition for nanoimprinting, the polymerizable compound is preferably composed of 10% by mass to 80% by mass of a monofunctional polymerizable unsaturated monomer, 1% by mass to 60% by mass of a difunctional polymerizable unsaturated monomer, and 1% by mass to 60% by mass of a trifunctional or higher polymerizable unsaturated monomer, and is more preferably composed of 15% by mass to 70% by mass of a monofunctional polymerizable unsaturated monomer, 2% by mass to 50% by mass of a difunctional polymerizable unsaturated monomer, and 2% by mass to 50% by mass of a trifunctional or higher polymerizable unsaturated monomer.

Also, in the resist composition for nanoimprinting, a polymerizable unsaturated monomer (second polymerizable unsaturated monomer) which includes at least one site containing an ethylene-based unsaturated bond and also includes and at least one of a silicon atom and a phosphorus atom may be blended with the above ingredients. Generally, for the purpose of enhancing separability from a mold structure and adhesion to a substrate, the second polymerizable unsaturated monomer is added in such a manner as to occupy 0.1% by mass or more of the whole polymerizable compound. It is preferably added in such a manner as to occupy 0.2% by mass to 10% by mass, more preferably 0.3% by mass to 7% by mass, particularly preferably 0.5% by mass to 5% by mass, of the whole polymerizable compound. The number of the site(s) containing ethylene-based unsaturated bond(s) (number of functional group(s)) is preferably one to three.

The water content of the resist composition for nanoimprinting when prepared is preferably 2.0% by mass or less, more preferably 1.5% by mass or less, particularly preferably 1.0% by mass or less. In the case where the water content thereof when prepared is 2.0% by mass or less, it is possible to further enhance the storage stability of the resist composition for nanoimprinting.

Also, the resist composition for nanoimprinting may be prepared as an organic solvent solution, using an organic solvent. Examples of organic solvents able to be favorably used for the resist composition for nanoimprinting include solvents commonly used for curable compositions for photo nanoimprint lithography and photoresists. The organic solvent is not particularly limited as long as it dissolves compounds and allows the compounds to disperse uniformly and it does not react with components of the compounds.

<Fluorine-containing Compound A>

Functioning as a coating auxiliary agent for the resist composition, the fluorine-containing compound A improves the coatability of the resist composition and makes it possible to form a resist layer with its patterned shape and a residual film being uniform.

The lower limit of the viscosity of the fluorine-containing compound A at 25° C. is 5,000 mPa·s or greater, preferably 5,500 mPa·s or greater.

The upper limit of the viscosity of the fluorine-containing compound A at 25° C. is preferably 20,000 mPa·s or less.

When it is less than 5,000 mPa·s, coatability degrades, and the resist layer cannot be formed such that a residual film left after imprinting becomes uniform; thus, a pattern, formed after etching with the use of the formed pattern as an etching resist, cannot be uniformly formed.

When it is greater than 20,000 mPa·s, the handleability of material(s) degrades, which may cause a decrease in productivity and an increase in cost.

The lower limit of the fluorine content of the fluorine-containing compound A is preferably 10% by mass or greater, more preferably 20% by mass or greater.

When it is less than 10% by mass, it is difficult to keep a favorable balance between efficiency, derived from surface coatability and uneven distribution at the surface effected by the introduction of fluorine atoms, and defect reduction achieved by suppressing adhesion of the resist to a mold structure after application of the resist.

The upper limit of the fluorine content of the fluorine-containing compound A is preferably 70% by mass or less.

When it is greater than 70% by mass, the solubility of the fluorine-containing compound A in an employed solvent decreases, and concern grows over effects on the environment.

The amount of the fluorine-containing compound A contained is not particularly limited; however, it is preferably in the range of 0.0002% by mass to 0.05% by mass with respect to the total amount of the resist composition. It is preferably in the range of 0.0002% by mass to 0.01% by mass as a range whereby effects can be exhibited with a smaller amount of the fluorine-containing compound A and merit can be gained in terms of cost.

By using a small amount of the fluorine-containing compound A having a viscosity of 5,000 mPa·s or greater in the resist composition, a layer composed mainly of the fluorine-containing compound A is formed as the outermost layer of the resist layer, the viscosity of the fluorine-containing compound A is 5,000 mPa·s or greater when the layer is formed, and thus it is possible to stabilize the outermost surface of the resist layer when the resist layer including the polymerizable compound having a low viscosity of 100 mPa·s or less in the present invention is formed. As a result, it is possible to improve the surface state of the resist layer when formed by spin coating or the like and thus to form a thin film having a uniform thickness on the entire surface of a coating region even when the film is so thin as to be 50 nm or less in thickness.

When the amount of the fluorine-containing compound A contained in the resist composition is less than 0.0002% by mass, the surface state of the resist layer formed after application of the resist composition is not satisfactory, causing depressions in the surface or an increase in the distribution of the layer thickness with respect to a radius direction. Thus, when a pattern is transferred to the resist layer in an imprinting step subsequent to the application, portions of the resist layer on the outer side may be subject to loss of the pattern.

Conversely, when the amount of the fluorine-containing compound A contained in the resist composition is more than 0.05% by mass, the amount of the fluorine-containing compound A is more than is necessary; moreover, there is degradation of the surface state, for example a high incidence of formation of a granular shape on the outermost layer composed mainly of the fluorine-containing compound A, and thus the pattern quality decreases in minute pattern formation; also, the thickness of the layer equivalent to the layer of the fluorine-containing compound A is 0.5 nm or greater, which may have a great adverse effect on the pattern size, especially in miniaturization of the pattern.

The viscosity of the fluorine-containing compound A is preferably 5,000 mPa·s or greater; the viscosity is preferably made as high as possible, provided that the solubility thereof in the resist composition can be secured.

The solid content of the fluorine-containing compound A is not particularly limited; however, it preferably ranges from 0.005% by mass to 1.25% by mass, more preferably from 0.01% by mass to 1.0% by mass.

When the solid content is less than 0.005% by mass, there is concern over lack of stability of the layer when formed, the surface state degrades when the resist composition is applied or baked, the uniformity of the layer thickness at the time of layer formation degrades, and consequently the uniformity of a residual film on the pattern formed after imprinting may degrade. When the solid content is more than 1.25% by mass, an excessive amount of the fluorine-containing compound A is applied at the time of layer formation, possibly forming a granular abnormal surface shape, and there may be an adverse effect on the quality after imprinting; moreover, imprinting-related effects yielded by the after-mentioned fluorine-containing compound B may be lessened.

<Fluorine-containing Compound B>

The fluorine-containing compound B improves separability from a mold structure, suppresses the occurrence of separation-related defects and pattern defects and improves productivity.

The upper limit of the viscosity of the fluorine-containing compound B at 25° C. is 2,000 mPa·s or less, more preferably 1,000 mPa·s or less, particularly preferably 200 mPa·s or less.

The lower limit of the viscosity of the fluorine-containing compound B at 25° C. is preferably 50 mPa·s or greater.

When it is less than 50 mPa·s, it is difficult to secure coatability yielded by the fluorine-containing compound A also used, and thus the coatability and the surface state stability may degrade.

When it is greater than 2,000 mPa·s, pattern formability degrades owing to poor separability; consequently, formation of a pattern with a residual film being thin and uniform is impossible; thus, a pattern, formed after etching with the use of the formed pattern as an etching resist, cannot be uniformly formed.

The lower limit of the fluorine content of the fluorine-containing compound B is preferably 10% by mass or greater, more preferably 20% by mass or greater.

When it is less than 10% by mass, it is difficult to keep a favorable balance between efficiency, derived from surface coatability and uneven distribution at the surface effected by the introduction of fluorine atoms, and defect reduction achieved by suppressing adhesion of the resist to a mold structure after application of the resist.

The upper limit of the fluorine content of the fluorine-containing compound B is preferably 70% by mass or less.

When it is greater than 70% by mass, the solubility of the fluorine-containing compound B in an employed solvent decreases, and concern grows over effects on the environment.

With the fluorine-containing compound B which has the above-mentioned viscosity and fluorine content, it is possible to suppress decrease in etching resistance and decrease in the quality of the resist layer (e.g. formation of a granular shape) caused by the presence of the mixed ingredients in the resist layer.

The amount of the fluorine-containing compound B contained is not particularly limited; however, it is preferably in the range of 0.05% by mass to 0.4% by mass with respect to the total amount of the resist composition.

By using a desired amount of the fluorine-containing compound B having a viscosity of 2,000 mPa·s or less in the resist composition, a layer composed mainly of the fluorine-containing compound B is formed as a resist surface layer.

Further, by forming, as an interfacial layer between the resist layer and a mold structure, a layer composed mainly of the fluorine-containing compound B so as to have a thickness of approximately 0.5 nm or greater in a process of forming a patter by imprinting in which the resist layer is brought into contact with the mold structure, it is possible to utilize the interfacial layer, composed mainly of the fluorine-containing compound B, as a lubrication layer when the mold structure is separated from the resist layer after curing the resist layer later in the imprinting. As a result, the mold structure can be smoothly separated, an imprint pattern can be formed without causing pattern defects such as loss, detachment, tearing, etc. of the pattern, and an imprint pattern can be obtained without problems, notably when a minute pattern having a line width of 50 nm or less is to be formed. Furthermore, the fact that smooth separation of the mold structure is enabled makes it possible to adapt to swifter separation of the mold structure, and so productivity can be improved as a result. When the imprint pattern is used as an etching resist, the thickness of a residual film formed after imprinting, which is equivalent to the distance between the bottom of the pattern and the interface that lies between the resist layer and a substrate, is required to be further reduced; it should be noted that an imprint pattern can be formed without causing pattern defects, even if the residual film is made so thin as to be 10 nm or less.

When the amount of the fluorine-containing compound B contained is in the preferred range, the above-mentioned function as a lubrication layer can be sufficiently performed.

When the amount of the fluorine-containing compound B contained is less than 0.05% by mass with respect to the total amount of the resist composition, effects of the fluorine-containing compound B are insufficient, and pattern defects may occur in the mold separating step subsequent to the imprinting.

Conversely, when the amount of the fluorine-containing compound B contained is more than 0.4% by mass with respect to the total amount of the resist composition, the thickness of the layer composed mainly of the fluorine-containing compound B is so great as to be 4 nm or greater, and the line width may vary greatly, notably when a minute pattern having a line width of 50 nm or less is formed. Moreover, a granular surface shape will be formed regarding the surface state of the resist layer after formed, depending upon the material(s) used, and thus the pattern quality after the imprinting may lower.

The solid content of the fluorine-containing compound B is not particularly limited; however, it is preferably 1.0% by mass to 10.0% by mass, more preferably 2.0% by mass to 4.0% by mass.

When the solid content is less than 1.0% by mass, effects of the fluorine-containing compound B on separability are insufficient, and thus the quality of imprinting for a minute pattern may degrade. When the solid content is more than 10.0% by mass, effects of the fluorine-containing compound A for coatability are hindered, and the amount of the fluorine-containing compounds contained in the resist layer is so great that granular foreign matter may be formed at the time of layer formation, thereby possibly degrading the state of the coating surface; consequently, there is concern over a decrease in pattern quality after the imprinting, and the function of the resist layer as an etching resist may be degraded.

<Fluorine-containing Compounds>

The fluorine-containing compound A and the fluorine-containing compound B are not particularly limited as long as the above-mentioned viscosities and the fluorine contents are satisfied, and these compounds may be suitably selected according to the purpose and may be low-molecular compounds or high-molecular compounds.

The amount of all the fluorine-containing compounds composed of the fluorine-containing compound A and the fluorine-containing compound B, contained in the resist composition, is preferably in the range of 0.0502% by mass to 0.45% by mass.

The fluorine-containing compounds are not particularly limited and may be suitably selected according to the purpose. Preferred examples thereof include fluorine-containing compounds known as fluorochemical surfactants, and fluorine-containing compounds known as fluorine-silicone surfactants. These may be used individually or in combination.

With regard to the fluorine-containing compounds known as fluorochemical surfactants, fluorine-containing compounds known as nonionic fluorochemical surfactants are preferable.

Specific examples of the nonionic fluorochemical surfactants include FLUORAD FC-430 and FC-431 (product names) (manufactured by Sumitomo 3M Limited); SURFLON S-382 (product name) (manufactured by ASAHI GLASS CO., LTD.); EFTOP EF-122A, 122B, 122C, EF-121, EF-126, EF-127 and MF-100 (product names) (manufactured by Tohkem products Corporation); PF-636, PF-6320, PF-656 and PF-6520 (product names) (manufactured by OMNOVA Solutions Inc.); FTERGENT FT250, FT251 and DFX18 (product names) (manufactured by NEOS COMPANY LIMITED); UNIDYNE DS-401, DS-403 and DS-451 (product names) (manufactured by DAIKIN INDUSTRIES, LTD.); and MEGAFAC 171, 172, 173, 178K and 178A (product names) (manufactured by Dainippon Ink and Chemicals, Incorporated). Specific examples of nonionic silicon surfactants include SI-10 (product name) Series (manufactured by TAKEMOTO OIL & FAT Co., Ltd.); MEGAFAC PAINTAD 31 (product name) (manufactured by Dainippon Ink and Chemicals, Incorporated); and KP-341 (product name) (manufactured by Shin-Etsu Chemical Co., Ltd.).

Specific examples of the fluorine-silicone surfactants include X-70-090, X-70-091, X-70-092 and X-70-093 (product names) (manufactured by Shin-Etsu Chemical Co., Ltd.); and MEGAFAC R-08 and XRB-4 (product names) (manufactured by Dainippon Ink and Chemicals, Incorporated).

<Other Component(s)>

The resist composition may, if necessary, contain other component(s) in addition to the above-mentioned components.

The other component(s) is/are not particularly limited as long as it/they does/do not impair effects of the present invention, and it/they may be suitably selected according to the purpose. Examples thereof include an interfacial coupling agent, a release agent, a silane coupling agent, a photopolymerization initiator, a polymerization inhibitor, an antioxidant, an ultraviolet absorber, a light stabilizer, an anti-aging agent, a plasticizer, an adhesion accelerator, a thermal polymerization initiator, a colorant, inorganic particles, elastomer particles, a photoacid generator, a photoacid proliferating agent, a photobase generator, a basic compound, a fluidity adjuster, an anti-foaming agent and a dispersant. Examples thereof also include solvents selected according to these components.

—Photopolymerization Initiator—

The resist composition for nanoimprinting may contain a photopolymerization initiator. The photopolymerization initiator occupies 0.1% by mass to 11% by mass, preferably 0.2% by mass to 10% by mass, even more preferably 0.3% by mass to 10% by mass, of the whole composition. Note that in the case where the photopolymerization initiator is used in combination with other photopolymerization initiator(s), the total amount of these photopolymerization initiators is in the above range.

(Resist Layer)

For the purpose of maintaining stability of the formation of a resist layer and improving separability from a mold structure, a resist layer of the present invention includes the fluorine-containing compound A and the fluorine-containing compound B in a surface layer region of the resist layer which lies from a surface of the resist layer to a depth of 2.4 nm or less from the surface, wherein the resist layer is formed by applying the above-mentioned resist composition.

The surface layer region is not particularly limited as long as it lies from the surface of the resist layer to a depth of 2.4 nm or less from the surface, and the surface layer region may be suitably selected according to the purpose; however, it preferably lies from the surface to a depth of 0.5 nm to 2.0 nm from the surface, more preferably from the surface to a depth of 0.8 nm to 2.0 nm from the surface.

When the surface layer region lies from the surface of the resist layer to a depth of less than 0.5 nm from the surface, sufficient mold separability may not possibly be obtained, and thus pattern defects related to peeling off of the resist layer may occur in a noticeable manner when productivity is to be further improved.

When the surface layer region lies from the surface of the resist layer to a depth of greater than 2.0 nm from the surface, it may be difficult to achieve a desired pattern size, especially in a pattern size range where the line width is 50 nm or less, or even 25 nm or less; in particular, the shape created by shaping a substrate with etching or the like may not be a desired shape.

X and Y measured by a method using etching and ESCA preferably satisfy the relationship $Y/X \geqq 0.99$, where X denotes the total amount (% by mass) of the fluorine-containing compound A and the fluorine-containing compound B contained in the resist layer, and Y denotes the amount (% by mass) of the fluorine-containing compound A and the fluorine-containing compound B present in the surface layer region of the resist layer.

The fluorine-containing compound A and the fluorine-containing compound B tend to be distributed in a localized manner at the surface of the resist layer, and it is desirable that 99% by mass or more of the fluorine-containing compounds be distributed in the surface layer region which lies from the surface of the resist layer to a depth of 2.4 nm or less from the surface. It is more desirable that 99% by mass or more of the fluorine-containing compounds be distributed in the surface layer region which lies from the surface of the resist layer to a depth of 0.5 nm to 2.0 nm from the surface.

Such a distribution of the fluorine-containing compounds at the surface makes it possible to reduce surface energy, even when they are used in small amounts, and to form a surface layer region (surface layer) containing the fluorine-containing compounds, that has a favorable thickness distribution.

When less than 99% by mass of the fluorine-containing compounds are distributed in the surface layer region, there is a great adverse effect on properties of the resist layer, such as etching resistance.

The distribution of the fluorine-containing compounds at the surface is measured by a method using etching and ESCA.

Specifically, the distribution of the fluorine-containing compound A and the fluorine-containing compound B with respect to a thickness direction can be measured by the method using etching and ESCA.

More specifically, the elemental composition at the surface of the resist layer made of the resist composition formed over the substrate is measured by ESCA (ESCA measuring apparatus: ESCA-3400, manufactured by SHIMADZU CORPORATION), and the ratio of the total area value of F to the total area value of C is calculated as an index value of the amount of fluorine. Further, a measurement sample is etched with argon ions from its surface to remove the measurement sample by a predetermined thickness; subsequently, also at another surface which appears after the removal, the index value of the amount of fluorine at a specific depth is calculated based upon the total area values of F and C measured by ESCA.

By sequentially measuring the index values of the amounts of fluorine at specific depths each corresponding to an amount of etching related to a length of time of etching, it is possible to measure the profile of the amounts of fluorine with respect to a depth direction, and thus measure the distribution of the amounts of fluorine with respect to the depth direction.

In the present invention, in a surface layer of the resist layer, the fluorine-containing compound A is unevenly distributed closer to the surface side than the fluorine-containing compound B is, thereby securing both coatability on the surface layer side, and suitability for the mold separating step at the time of imprinting, which is effected by the fluorine-containing compound B.

The reason why the fluorine-containing compound A and the fluorine-containing compound B are distributed as described above in the surface layer of the resist layer is not definitely clear; however, in general, the higher the viscosity of a compound is, the greater the molecular weight of the compound is; also, the greater the molecular weight of a compound is, the lower the compatibility of the compound is with a matrix in the resist layer; therefore, the compound having a greater molecular weight tends to be unevenly distributed closer to the surface side. Hence, it is inferred that the fluorine-containing compound A having a greater viscosity is distributed closer to the surface side.

The thickness of the resist layer is preferably 100 nm or less.

When the thickness is greater than 100 nm, the thickness of a residual resist layer (residual film) at concave portions of a pattern formed is equal to or greater than ½ times the height of the pattern in the case where the pattern has a line width of 100 nm or less and an aspect ratio of 2 or greater. In this case, the resist pattern is damaged in a process of removing the residual film in an etching step that is a subsequent step, and the resist pattern is insufficient in terms of height and width. Thus, especially when a minute pattern is formed, pattern defects such as distortion of the shape of the pattern top caused by etching-related damage occur, and thus there is such a disadvantage as a decrease in pattern quality.

(Imprinting Method)

An imprinting method of the present invention includes pressing an imprint mold, which has a patterned shape, against the resist layer from the side of the surface layer region of the resist layer so as to imprint the resist layer with a resist pattern made by transferring the patterned shape as a template.

The imprint mold (mold structure) is not particularly limited as long as it has a minute patterned shape, and it may be suitably selected according to the purpose.

The resist pattern formed at the resist layer is made by transferring the patterned shape of the imprint mold (mold structure) as a template, and the resist pattern has a patterned shape roughly similar to the minute patterned shape of the imprint mold.

The pitch of convex portions of the mold structure preferably ranges from 30 nm to 200 nm.

The width of a convex portion preferably ranges from 15 nm to 60 nm.

The width of a concave portion preferably ranges from 15 nm to 100 nm.

It is desirable that the convex portions be provided with a taper from the base end side toward the pointed end side, in view of facilitation of release of the mold after the imprinting.

The taper angle of the taper preferably ranges from 70° to 88°.

An apparatus for pressing the imprint mold against the resist layer is not particularly limited and may be suitably selected according to the purpose.

The length of time in which the pressed imprint mold is separated from the resist layer generally ranges from approximately 10 seconds to approximately 15 seconds, for example in the case where a pattern is formed inside a 2.5-inch disc; here, it should be noted that the imprinting method using the resist composition makes it possible to separate the imprint mold in 1 second to 10 seconds without causing separation-related defects, thereby improving productivity.

(Pattern Formation)

A pattern formation of the present invention includes a patterned shape formed by performing etching, using as a mask a resist pattern formed by the above-mentioned imprinting method.

The pattern formation is satisfactory as long as it includes the patterned shape, and the pattern formation is not particularly limited.

The structure of the pattern formation is not particularly limited and may be suitably selected according to the purpose. For instance, the pattern formation is satisfactory as long as it includes a patterned shape formed by performing etching, using as a mask a resist pattern formed by the above-mentioned imprinting method, and a layer which is a target for the etching may be selected from a variety of layers.

The pattern formation is, for example, used for semiconductors, devices, magnetic recording media, optical films, and imprint molds employed in imprint processes intended for such uses. Among these, preference is given to magnetic recording media.

(Method for Producing Pattern Formation and Method for Producing Magnetic Recording Medium)

A method for producing a pattern formation and a method for producing a magnetic recording medium according to the present invention each include an imprinting step and a pattern forming step.

The imprinting step and the pattern forming step may be applied to the above-mentioned imprinting method.

<Imprinting Step>

The imprinting step is a step of forming the above-mentioned resist layer on a substrate and pressing an imprint mold, which has a patterned shape, against the resist layer from the side of the surface layer region of the resist layer so as to imprint the resist layer with a resist pattern made by transferring the patterned shape as a template, and the imprinting step includes a surface step, a resist layer forming step, an imprint processing step and a curing step.

—Surface Step—

The surface step is a step of laying a substrate surface and a coupling layer in this order over the substrate.

In the case of a magnetic recording medium, there is a step of laying a magnetic layer and a coupling layer in this order. As shown in FIG. 1A, a magnetic layer 12 is formed over a substrate 11; thereafter, over the magnetic layer 12, an interfacial coupling agent is applied to form a coupling layer 13.

The material for the substrate 11 is not particularly limited, and examples thereof include quartz, glass, optical films, ceramic materials, vapor-deposited films, magnetic films, reflective films, metal substrates of Ni, Cu, Cr, Fe, etc., paper, SOG, polymer substrates such as polyester films, polycarbonate films and polyimide films, TFT array substrates, electrode plates of PDP, substrates of glass or transparent plastic, conductive base materials of ITO, metals, etc., insulating base materials, and semiconductor substrates of silicone, silicone nitride, polysilicone, silicone oxide, amorphous silicone, etc. The substrate may be shaped like a plate or a roll.

The material for the magnetic layer 12 is not particularly limited and may be suitably selected from materials known in the art, according to the purpose. Suitable examples thereof include Fe, Co, Ni, FeCo, FeNi, CoNi, CoNiP, FePt, CoPt and NiPt. These may be used individually or in combination.

The thickness of the magnetic layer 12 is not particularly limited and may be suitably selected according to the purpose. Generally, though, it ranges from approximately 5 nm to approximately 30 nm.

The method for forming the magnetic layer 12 is not particularly limited, and the magnetic layer 12 may be formed by a method known in the art, for example sputtering method or electrodeposition (electrodeposition method).

Between the substrate 11 and the magnetic layer 12, a crystalline orientation layer for orientation of the magnetic layer and/or a soft magnetic underlying layer may be suitably formed. Note that the soft magnetic underlying layer may have a single-layer or multilayer structure.

The method of treating the interfacial coupling agent is not particularly limited and may be suitably selected according to the purpose and selected from methods known in the art. For example, the method of treating the interfacial coupling agent may be selected from a method of forming a layer of an interfacial coupling agent in a laminated manner by bar coating, dip coating, spin coating, vapor deposition, etc., a method of forming a layer of an interfacial coupling agent over a substrate surface by annealing at normal temperature with immersion, and so forth. At this time, the layer of the interfacial coupling agent may be formed with the interfacial coupling agent being used without any change to it, or the layer of the interfacial coupling agent may be formed with the interfacial coupling agent being diluted with solvent or the like.

Meanwhile, as the method of treating the coupling layer 13 after it is formed, what is preferably used is a method of forming a layer of an interfacial coupling agent over the magnetic layer 12, then accelerating binding reaction between the interfacial coupling agent and the surface of the magnetic layer 12, for example by annealing at a high temperature of approximately 100° C., and forming interfacial bonds. Also, the surplus interfacial coupling agent is preferably removed, for example by washing with solvent. Whichever of the washing of the surface of the laminated object for formation of the magnetic recording medium and the annealing at the high temperature is carried out first, it does not matter; however, it is preferable to carry out the washing first because the surplus interfacial coupling agent can be removed to a greater extent.

It is preferable to subject the magnetic layer 12 to an activation treatment.

The activation treatment is a treatment in which the molar ratio of hydroxyl group-containing element(s) at the surface of the laminated object for formation of the magnetic recording medium is made equal to or greater than 20% by activating the surface of the magnetic layer 12 with any one of UV irradiation, oxygen plasma, oxygen ashing, alkali treatment, acid treatment, etc.

By activating the surface of the magnetic layer 12 with UV irradiation, oxygen plasma, oxygen ashing, alkali treatment, acid treatment, etc. prior to the treatment with the interfacial coupling agent, it is possible to increase the number of bonds formed at the interface between a resist layer 14 and the magnetic layer 12 and thus further strengthen the interface and also to remove dirtiness on the treated surface and thus improve the surface state.

—Resist Layer Forming Step—

The resist layer forming step is a step of forming the resist layer 14 over the surface-treated magnetic layer 12.

The resist layer 14 is formed by applying the resist composition for nanoimprinting, according to a generally known coating method such as dip coating, air knife coating, curtain coating, wire bar coating, gravure coating, extrusion coating, spin coating or slit scanning. The thickness of the resist layer 14 formed of the resist composition for nanoimprinting varies depending upon the use, but it is in the range of 0.05 µm to 30 µm. Also, the resist composition for nanoimprinting may be multiply applied.

Light for curing the resist composition for nanoimprinting is not particularly limited. Examples thereof include high-energy ionizing radiation, and light/radiation having a wavelength in the near-ultraviolet region, far-ultraviolet region, visible region, infrared region, etc.

As a source of the high-energy ionizing radiation, an electron beam accelerated by an accelerating device such as a Cockcroft accelerator, Van de Graaff accelerator, linear accelerator, betatron or cyclotron is used most economically and conveniently from an industrial point of view; besides, a radioactive isotope, or radiation such as a γ-ray, X-ray, α-ray, neutron beam or proton beam, emitted from a reactor or the like, may be used.

Examples of ultraviolet light sources include ultraviolet fluorescent lamps, low-pressure mercury-vapor lamps, high-pressure mercury-vapor lamps, ultrahigh-pressure mercury-vapor lamps, xenon lamps, carbon-arc lamps and sunlamps. Examples of the radiation include microwaves and EUV. Besides, light produced by an LED, semiconductor laser light, and laser light used in fine shaping of semiconductors such as KrF excimer laser light having a wavelength of 248 nm and ArF excimer laser light having a wavelength of 193 nm can be suitably used. As such light, monochrome light or light (mixed light) having different wavelengths may be used.

—Imprint Processing Step—

The imprint processing step is a step of forming a pattern (notably a minute concavo-convex pattern) at the resist layer 14 formed of the resist composition for nanoimprinting.

Figure 1B:
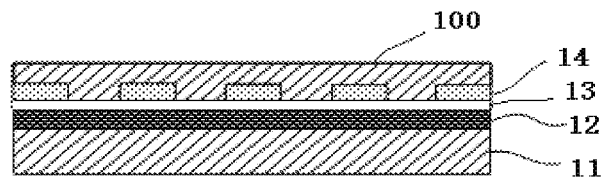
FIG. 1B is a process drawing (2) showing the example of the method for producing the magnetic recording medium of the present invention.

As shown in FIG. 1B, a mold structure 100 is pressed against the resist layer 14 from the surface side of the resist layer 14, then the mold structure 100 is separated from the resist layer 14 to form a resist pattern at the resist layer 14 (hereinafter, this resist pattern will also be denoted by the numeral 14).

Specifically, the resist composition for nanoimprinting is applied and, if necessary, dried to form the resist layer (resist pattern) 14 made of the resist composition and thereby produce a pattern receptor, the mold structure 100 is brought into contact with the surface of the pattern formation layer of the pattern receptor with application of pressure so as to transfer the pattern of the mold structure to the pattern formation layer, and the layer with the minute concavo-convex pattern is exposed and thus cured. Photo imprint lithography according to the pattern forming procedure enables lamination and multiple patterning and may be used in combination with ordinary thermal imprinting.

Here, the mold structure 100 is explained. In photo nanoimprint lithography in which the resist composition for photo nanoimprint lithography is used, at least one of the mold structure 100 and the substrate 11 needs to be made of a light-permeable material. In the photo nanoimprint lithography, a curable composition for photo nanoimprint lithography is applied onto the substrate 11, a light-permeable mold is pressed against the curable composition, and light is applied from the back surface of the mold so as to cure the curable composition. Alternatively, the following may be carried out: a curable composition for photo nanoimprint lithography is applied onto a light-permeable substrate (not shown), the mold structure 100 is pressed against the curable composition, and light is applied from the back surface of the substrate so as to cure the curable composition.

The light may be applied while the mold structure 100 is attached to the curable composition or after the mold structure 100 has been separated from the curable composition, preferably while the mold structure 100 is closely attached to the curable composition.

Figure 2:
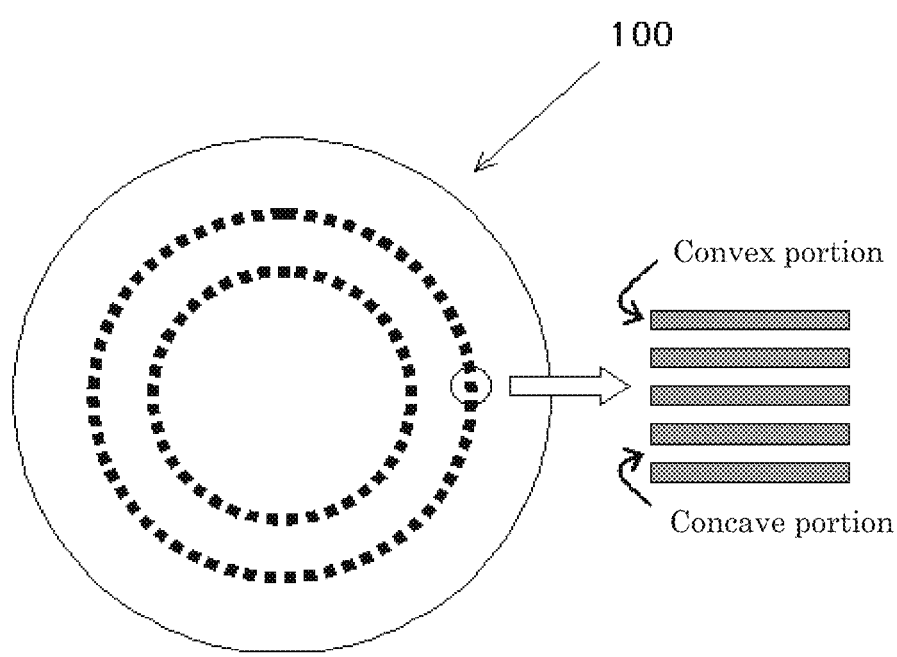
FIG. 2 is a drawing schematically showing the structure of a mold structure 100 in FIG. 1A.
Figure 3A:
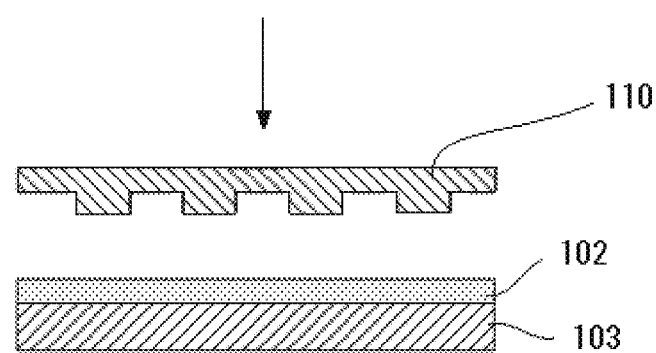
FIG. 3A is a schematic drawing (1) showing a conventional imprinting method.
Figure 3B:
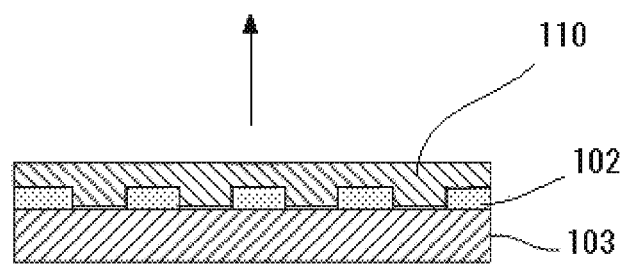
FIG. 3B is a schematic drawing (2) showing the conventional imprinting method.
Figure 3C:
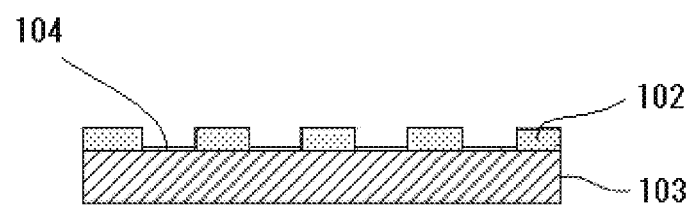
FIG. 3C is a schematic drawing (3) showing the conventional imprinting method.

For the mold structure 100, a mold having a pattern to be transferred is used (see FIG. 2). A pattern may be formed on the mold structure 100 according to desired processing accuracy, for example by photolithography or electron beam lithography. The method for forming the pattern of the mold structure is not particularly limited.

The material for the light-permeable mold is not particularly limited and is satisfactory as long as it has predetermined strength and durability. Specific examples thereof include glass, quartz, light-transparent resins such as PMMA and polycarbonate resin, transparent vapor-deposited metal films, soft films such as of polydimethyl siloxane, photocurable films and metal films.

The material for a light-impermeable mold is not particularly limited and is satisfactory as long as it has predetermined strength. Specific non-limiting examples thereof include ceramic materials, vapor-deposited films, magnetic films, reflective films, metal substrates of Ni, Cu, Cr, Fe, etc., and substrates of SiC, silicone, silicone nitride, polysilicone, silicone oxide, amorphous silicone, etc. The light-impermeable mold may be shaped like a plate or a roll. The roll-shaped mold is used, especially when continuous productivity in terms of transfer is required.

The mold structure 100 is preferably subjected to a release treatment to improve separability between the mold structure 100 and the curable composition for photo nanoimprint lithography. The release treatment is, for example, carried out using a silicone-based or fluorine-based silane coupling agent; more specifically, a commercially available release agent such as OPTOOL DSX (product name) manufactured by DAIKIN INDUSTRIES, LTD. or NOVEC EGC-1720 (product name) manufactured by Sumitomo 3M Limited can be suitably used, for example.

In the case where photo imprint lithography is performed, it is, in general, preferably performed such that the mold structure 100 is pressed under an atmospheric pressure of 10 atm or less. When the atmospheric pressure is 10 atm or less, it is preferable because there is a tendency that the mold structure 100 and the substrate 11 do not easily deform, which yields an improvement in pattern accuracy, and that an apparatus can be reduced in size because of the low pressure. It is desirable that the pressure applied to the mold structure be selected so as to be able to secure uniformity of transfer of the pattern of the mold structure, with the amount of a residual film of the curable composition at convex portions being small.

The application of light in the photo imprint lithography is satisfactory as long as the amount of the light applied is sufficiently greater than the amount thereof required to cure the composition. The amount thereof required to cure the composition is determined by the consumption of unsaturated bonds in the curable composition for photo nanoimprint lithography and the tackiness of a curable film.

Also in the photo imprint lithography, the temperature of the substrate 11 when the light is applied is generally room temperature; however, in order to enhance reactivity, the light may be applied with heating. The light may be applied in a vacuum state because, when a vacuum state is created as a stage prior to the light application, there are favorable effects on prevention of entry of air bubbles, suppression of decrease in reactivity caused by entry of oxygen, and improvement in adhesion between the mold structure and the curable composition for photo nanoimprint lithography. The degree of vacuum is preferably in the range of $10^{-1}$ Pa to normal pressure.

The resist composition for nanoimprinting can be prepared as a solution by mixing components thereof and then filtering the mixture with a filter of 0.05 μm to 5.0 μm in pore diameter, for example. The mixing and dissolution of the curable composition for photo nanoimprint lithography are generally performed in the temperature range of 0° C. to 100° C. The filtration may be performed in multiple stages or repeated many times, for example. Additionally, the filtered solution may be filtered again. The material used for the filter is not particularly limited and may, for example, be polyethylene resin, polypropylene resin, fluorine resin or nylon resin.

—Curing Step—

The curing step is a step of curing the formed resist pattern 14. The curing step is not particularly limited and may be suitably selected according to the purpose. Suitable examples thereof include entire surface heating and entire surface exposure.

As a method of performing the entire surface heating, there is, for example, a method of heating the entire surface of the formed resist pattern 14. The entire surface heating makes it possible to increase the film strength of the surface of the resist pattern 14. The heating temperature at which the entire surface heating is performed is preferably in the range of 80° C. to 200° C., more preferably in the range of 90° C. to 180° C. When the heating temperature is 80° C. or higher, the film strength tends to increase further by the heating. When the heating temperature is 200° C. or lower, the components of the curable composition for photo nanoimprint lithography decompose, and thus the tendency that the layer becomes weak and brittle can be suppressed more effectively.

An apparatus to perform the entire surface heating is not particularly limited and may be suitably selected from apparatuses known in the art, according to the purpose. Examples thereof include dry ovens, hotplates and IR heaters. In the case where a hotplate is used, the entire surface heating is preferably performed while a substrate with a pattern formed thereon is positioned a certain distance away from the plate to perform the heating uniformly.

As a method of performing the entire surface exposure, there is, for example, a method of exposing the entire surface of the resist pattern 14. The entire surface exposure makes it possible to promote curing in the composition constituting a photosensitive layer and cure the surface of the pattern and thus to enhance etching resistance.

An apparatus to perform the entire surface exposure is not particularly limited and may be suitably selected according to the purpose. Suitable examples thereof include UV exposing machines such as ultrahigh-pressure mercury-vapor lamps.

<Pattern Forming Step>

The pattern forming step is a step of performing etching, using as a mask the resist pattern formed by the imprinting step, so as to form a pattern at the magnetic layer 12, and the pattern forming step includes at least an etching step and a resist layer peeling step, preferably with the addition of a step of filling with a nonmagnetic layer.

—Etching Step—

The etching step is a step of removing underlying portions not covered with the resist pattern 14, using the resist pattern 14 as a mask.

Figure 1C:
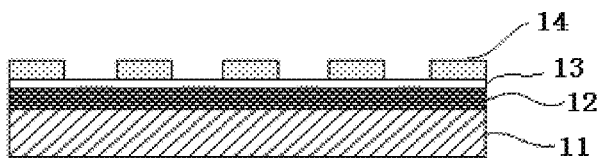
FIG. 1C is a process drawing (3) showing the example of the method for producing the magnetic recording medium of the present invention.

The etching is performed with the resist pattern 14 (shown in FIG. 1C) having been formed.

The etching step may be performed in accordance with a method suitably selected from etching processing methods known in the art and makes it possible to obtain a pattern of a thin film.

—Resist Layer Peeling Step—

The resist layer peeling step is a step of peeling off the resist pattern 14 after the etching step.

Figure 1D:
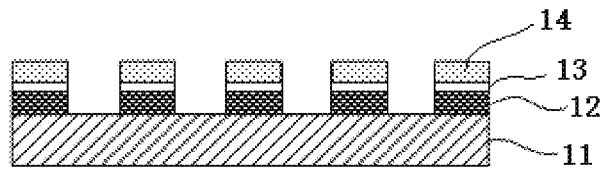
FIG. 1D is a process drawing (4) showing the example of the method for producing the magnetic recording medium of the present invention.

The resist pattern 14 is peeled off in the state where the etching has been performed as shown in FIG. 1D.

Regarding the peeling off of the resist pattern, the resist pattern may be removed by a method selected from several peeling methods exemplified by removal of the resist pattern with a liquid (wet peeling), removal of the resist pattern after oxidizing the resist pattern by plasma discharge of oxygen gas under reduced pressure and thusly converting the form of the resist pattern to a gas form (dry peeling/ashing), and removal of the resist pattern after oxidizing the resist pattern with ozone and UV light and thusly converting the form of the resist pattern to a gas form (dry peeling/UV ashing). As liquids for the peeling, aqueous solutions such as sodium hydroxide aqueous solution, potassium hydroxide aqueous solution and ozone dissolution water, and organic solvents such as mixtures of amines and dimethyl sulfoxide or N-methylpyrrolidone are generally known. Well-known examples of the latter include a mixture of monoethanol amine and dimethyl sulfoxide (the mass-based mixture ratio of monoethanol amine to dimethyl sulfoxide is 7:3).

For the peeling process after the shaping of the magnetic layer 12, a dry peeling method is preferably used in view of a purpose of removing the coupling layer 13 that enhances adhesion between the resist pattern 14 and the magnetic layer 12 and a purpose of reducing damage to the shaped magnetic layer 12. Specifically, use of a combination of oxygen ashing and UV ashing is preferable.

—Step of Filling with Nonmagnetic Layer—

Figure 1E:
FIG. 1E is a process drawing (5) showing the example of the method for producing the magnetic recording medium of the present invention.

The step of filling with a nonmagnetic layer is a step in which concave portions in the concavo-convex shape formed in the magnetic layer 12 are filled with a nonmagnetic material 70 so as to flatten the surface, in the state where the resist pattern (resist layer) 14 has been peel off as shown in FIG. 1E.

If necessary, a protective film may be formed on the surface of the layer of the nonmagnetic material 70.

Examples of the nonmagnetic material include $SiO_2$, carbon and alumina; polymers such as polymethyl methacrylate (PMMA) and polystyrene (PS); and lubricating oil.

As the material for the protective film, diamond-like carbon (DLC), sputtered carbon or the like is preferable. Further, a lubricant layer may be provided on the protective film.

Figure 1F:
FIG. 1F is a process drawing (6) showing the example of the method for producing the magnetic recording medium of the present invention.

By carrying out the foregoing steps, a magnetic recording medium 20 is produced (see FIG. 1F).
(Magnetic Recording Medium)

A magnetic recording medium of the present invention is produced by the above-mentioned method for producing a magnetic recording medium.

As explained in relation to the method for producing a magnetic recording medium, the magnetic recording medium includes a substrate, and a magnetic layer at which a pattern has been formed, and if necessary includes other member(s) (layer(s)) suitably selected.

EXAMPLES

The following explains Examples of the present invention. It should, however, be noted that the present invention is not confined to these Examples in any way.

Example 1

In the following manner, a resist composition according to Example 1 was prepared, then a resist layer was formed using the resist composition, and a pattern formation was produced.
<Resist Layer Forming Step>

A coating solution of a silane coupling agent (KBM-5103, manufactured by Shin-Etsu Chemical Co., Ltd.; 1% (by mass) PGMEA solution) was applied onto a Si substrate by spin coating at a rotational speed of 1,000 rpm for 30 seconds and then baked at 120° C. for 15 minutes so as to produce an underlying layer-attached Si substrate.

Further, a resist composition composed of the following components was prepared, then this resist composition was applied over the underlying layer-attached Si substrate so as to be 40 nm thick after baking, and the resist composition was baked (60 C.°, one minute) so as to form a resist layer over the substrate.
—Resist Composition—
(1-A) Polymerizable compound (mixture of the following compounds (1-1) to (1-3)); viscosity: 20 mPa·s; crosslink density: 150 (Mw/number of acrylates): 40 g
(1-1) Polymerizable compound 1 (naphthylmethyl acrylate): 20 g
(1-2) Polymerizable compound 2 (1,4-diacryloyloxymethyl-benzene): 10 g
(1-3) Polymerizable compound 3 (CN-benzylmethyl acrylate): 10 g
(2) Fluorine-containing compound A (PF6320, manufactured by OMNOVA Solutions Inc.; viscosity 5,500 mPa·s; fluorine content 37% by mass): 0.04 g
(3) Fluorine-containing compound B (PF656, manufactured by OMNOVA Solutions Inc.; viscosity 1,800 mPa·s; fluorine content 49% by mass): 1.6 g
(4) Photopolymerization initiator (ethyl-2,4,6-triethylbenzoin phenylphosphinate) (TPO-L, manufactured by BASF SE): 0.8 g
(5) Commercially available organic solvent (PGMEA; solid content concentration: 4%): 956.8 g
<Imprinting Step>

A 2.5-inch disc-shaped quartz mold structure having on its surface a concavo-convex pattern made by arranging concentric convex portions on concentric circles at a pitch (denoted by "TP" in Tables blow) of 100 nm (concave portion width: 40 nm, depth: 120 nm, taper angle 83° was placed against the resist layer formed on the substrate, then the entire surface of the mold structure was uniformly pressed for 20 seconds at room temperature and an atmospheric pressure of 30 atm so as to transfer the concavo-convex pattern to the resist layer. In this state, the resist layer was cured by UV irradiation at 200 mj/cm$^2$ from the mold structure side so as to fix the patterned shape, then the mold structure was separated from the resist layer in five seconds so as to produce a pattern formation having the resist layer to which the concavo-convex pattern had been transferred.

Parenthetically, before the imprinting, the surface of the mold structure used was subjected to a release treatment using OPTOOL DSX (manufactured by DAIKIN INDUSTRIES, LTD.).
<Pattern Forming Step>

As to the pattern formation having the resist layer to which the concavo-convex pattern had been transferred, the substrate was cooled to 10° C. from its back surface and then dry-etched in accordance with the following procedure by RIE (ICP etching device NE-550, manufactured by ULVAC, Inc.) using as a mask the resist layer to which the concavo-convex pattern had been transferred, and a concavo-convex shape based upon the shape of the concavo-convex pattern of the resist layer was thereby formed at the substrate. Specifically, a residual film was etched to a depth of 13 nm under Condition (1) ($O_2$/Ar (ratio)=5/1; gas pressure: 0.6 Pa), then the substrate was etched under Condition (2) ($CF_4$/Ar (ratio)=1/2; gas pressure: 0.6 Pa) such that the calculational pattern height of the substrate was 100 nm after the etching.
<Resist Layer Peeling Step>

Thereafter, the surface of the pattern formation, provided with the concavo-convex shape, was subjected to an oxygen ashing treatment, and further, the surface was subjected to a UV treatment to remove the resist layer remaining after the shaping of the substrate.

Example 2

A pattern formation according to Example 2 was produced in the same manner as in Example 1, except that the length of time in which the mold structure was separated from the resist layer was changed from five seconds to two seconds in the imprinting step.

Example 3

A pattern formation according to Example 3 was produced in the same manner as in Example 1, except that the polymerizable compound (1-B) below was used in the resist composition instead of the polymerizable compound (1-A) above.
(1-B) Polymerizable compound (mixture of the following compounds (1-4) and (1-5)); viscosity: 30 mPa·s; crosslink density: 150 (Mw/number of acrylates): 40 g
(1-4) Polymerizable compound 4 (ARONIX M220 (M220), manufactured by TOAGOSEI CO., LTD.): 20 g
(1-5) Polymerizable compound 5 (ARONIX M310 (M310), manufactured by TOAGOSEI CO., LTD.): 20 g Examples 4 to 15 and Comparative Examples 1 to 6

Pattern formations according to Examples 4 to 15 and Comparative Examples 1 to 6 were produced in the same manner as in Example 1, except that the type and amount of the resist composition, and the length of time in which the mold structure was separated from the resist layer in the imprinting step were changed as shown in Tables 1-a, 1-b, 2-a and 2-b.

Here, the amount of the fluorine-containing compound B added is defined as the value (expressed as mass) obtained by multiplying 40 g as the polymerizable compound by the percentage written in relation to "solid content" of "fluorine-containing compound B" in Table 1-b (for instance, 40 g×0.50/100=0.2 g is the amount in the case of Example 4).

ZONYL FSO-100 shown in Table 2-b as the fluorine-containing compound A is the product name for a fluorine-containing compound manufactured by E. I. du Pont de Nemours and Company, and PLURONIC L101 POE(8)/POP(55) shown in Table 2-a is the product name for a fluorine-containing compound manufactured by BASF SE.

Z-DOL (FOMBLIN Z-DOL) shown in Table 1-b as the fluorine-containing compound B is the product name for a fluorine-containing compound manufactured by Solvay Solexis, Inc.

The viscosities, solid contents and fluorine contents of these fluorine-containing compounds are as shown in Tables 1-a, 1-b, 2-a and 2-b.

In Comparative Example 5, as a polymerizable compound, the following compound (1-C) was used instead of (1-A).
(1-C) Compound UA shown below; viscosity: 20,000 mPa·s; crosslink density: 150 (Mw/number of acrylates): 40 g

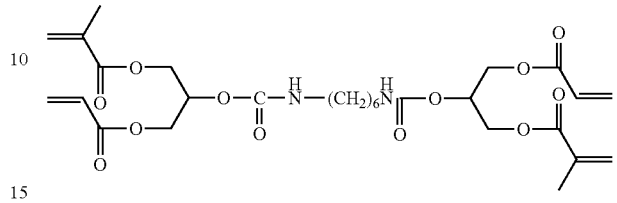

Compound UA

TABLE 1-a

| | Production method | | | | | | | | | |
|---|---|---|---|---|---|---|---|---|---|---|
| | Resist composition | | | | | | | | | |
| | | | | | | Polymerization initiator | | Fluorine-containing compound | | |
| | Substrate | | Polymerizable compound | | | | Solid content | | Solid content | Fluorine content |
| Ex./Comp. Ex. | Material | Surface treatment | Component | Viscosity mPa·s | Type | | % by mass | Fluorine-containing compound A (with high viscosity) | % by mass | % by mass | Viscosity mPa·s |
| Ex. 1 | Si | UV | 1-A | 20 | TPO-L | | 2% | PF6320 | 0.10% | 37% | 5,500 |
| Ex. 2 | Si | UV | 1-A | 20 | TPO-L | | 2% | PF6320 | 0.10% | 37% | 5,500 |
| Ex. 3 | Si | UV | 1-B | 30 | TPO-L | | 2% | PF6320 | 0.10% | 37% | 5,500 |
| Ex. 4 | Si | UV | 1-A | 20 | TPO-L | | 2% | PF6320 | 0.10% | 37% | 5,500 |
| Ex. 5 | Si | UV | 1-A | 20 | TPO-L | | 2% | PF6320 | 0.10% | 37% | 5,500 |
| Ex. 6 | Si | UV | 1-A | 20 | TPO-L | | 2% | PF6320 | 0.10% | 37% | 5,500 |
| Ex. 7 | Si | UV | 1-A | 20 | TPO-L | | 2% | PF6320 | 0.10% | 37% | 5,500 |
| Ex. 8 | Si | UV | 1-A | 20 | TPO-L | | 2% | PF6320 | 0.10% | 37% | 5,500 |
| Ex. 9 | Si | UV | 1-A | 20 | TPO-L | | 2% | PF6320 | 0.10% | 37% | 5,500 |
| Ex. 10 | Si | UV | 1-A | 20 | TPO-L | | 2% | PF6320 | 0.10% | 37% | 5,500 |
| Ex. 11 | Si | UV | 1-A | 20 | TPO-L | | 2% | PF6320 | 0.10% | 37% | 5,500 |
| Ex. 12 | Si | UV | 1-A | 20 | TPO-L | | 2% | PF6320 | 0.10% | 37% | 5,500 |
| Ex. 13 | Si | UV | 1-A | 20 | TPO-L | | 2% | PF6320 | 0.10% | 37% | 5,500 |
| Ex. 14 | Si | UV | 1-A | 20 | TPO-L | | 2% | PF6320 | 0.10% | 37% | 5,500 |
| Ex. 15 | Si | UV | 1-A | 20 | TPO-L | | 2% | PF6320 | 0.10% | 37% | 5,500 |

TABLE 1-b

| | Production method | | | | | | | | | | |
|---|---|---|---|---|---|---|---|---|---|---|---|
| | Resist composition | | | | | Evaluation after formation of resist layer | | Imprinting process | | | |
| | Fluorine-containing compound | | | | | | | Imprinting condition | | | |
| Ex./Comp. Ex. | Fluorine-containing compound B (with low viscosity) | Solid content % by mass | Fluorine content % by mass | Viscosity mPa·s | Solvent Type | Solid content concentration | Thickness Total nm | Mold structure Fluorine layer nm | TP/Width/Depth nm | Taper angle | Pressing condition | Length of time for mold separation |
| Ex. 1 | PF656 | 4.00% | 49% | 1,800 | PGMEA | 4% | 40 | 1.2 | 100/40/120 | 83° | r.t, 30 atm, 20 sec | 5 sec |
| Ex. 2 | PF656 | 4.00% | 49% | 1,800 | PGMEA | 4% | 40 | 1.2 | 100/40/120 | 83° | r.t, 30 atm, 20 sec | 2 sec |
| Ex. 3 | PF656 | 4.00% | 49% | 1,800 | PGMEA | 4% | 40 | 1.2 | 100/40/120 | 83° | r.t, 30 atm, 20 sec | 5 sec |
| Ex. 4 | PF656 | 0.50% | 49% | 1,800 | PGMEA | 4% | 40 | 0.2 | 100/40/120 | 83° | r.t, 30 atm, 20 sec | 5 sec |
| Ex. 5 | PF656 | 0.50% | 49% | 1,800 | PGMEA | 4% | 40 | 0.2 | 100/40/120 | 83° | r.t, 30 atm, 20 sec | 2 sec |
| Ex. 6 | PF656 | 1.00% | 49% | 1,800 | PGMEA | 4% | 40 | 0.3 | 100/40/120 | 83° | r.t, 30 atm, 20 sec | 5 sec |
| Ex. 7 | PF656 | 1.00% | 49% | 1,800 | PGMEA | 4% | 40 | 0.3 | 100/40/120 | 83° | r.t, 30 atm, 20 sec | 2 sec |
| Ex. 8 | PF656 | 2.00% | 49% | 1,800 | PGMEA | 4% | 40 | 0.6 | 100/40/120 | 83° | r.t, 30 atm, 20 sec | 5 sec |
| Ex. 9 | PF656 | 2.00% | 49% | 1,800 | PGMEA | 4% | 40 | 0.6 | 100/40/120 | 83° | r.t, 30 atm, 20 sec | 2 sec |

TABLE 1-b-continued

| | Resist composition | | | | | | Evaluation after formation of resist layer | | Imprinting process | | | |
|---|---|---|---|---|---|---|---|---|---|---|---|---|
| | Fluorine-containing compound | | | | Solvent | | Thickness | | Mold structure | | Imprinting condition | |
| Ex./Comp. Ex. | Fluorine-containing compound B (with low viscosity) | Solid content % by mass | Fluorine content % by mass | Viscosity mPa·s | Type | Solid content concentration | Total nm | Fluorine layer nm | TP/Width/Depth nm | Taper angle | Pressing condition | Length of time for mold separation |
| Ex. 10 | PF656 | 6.00% | 49% | 1,800 | PGMEA | 4% | 40 | 1.8 | 100/40/120 | 83° | r.t, 30 atm, 20 sec | 5 sec |
| Ex. 11 | PF656 | 6.00% | 49% | 1,800 | PGMEA | 4% | 40 | 1.8 | 100/40/120 | 83° | r.t, 30 atm, 20 sec | 2 sec |
| Ex. 12 | PF656 | 8.00% | 49% | 1,800 | PGMEA | 4% | 40 | 2.4 | 100/40/120 | 83° | r.t, 30 atm, 20 sec | 5 sec |
| Ex. 13 | PF656 | 8.00% | 49% | 1,800 | PGMEA | 4% | 40 | 2.4 | 100/40/120 | 83° | r.t, 30 atm, 20 sec | 2 sec |
| Ex. 14 | Z-DOL | 2.00% | 50% | 130 | PGMEA | 4% | 40 | 0.6 | 100/40/120 | 83° | r.t, 30 atm, 20 sec | 5 sec |
| Ex. 15 | Z-DOL | 2.00% | 50% | 130 | PGMEA | 4% | 40 | 0.6 | 100/40/120 | 83° | r.t, 30 atm, 20 sec | 2 sec |

TABLE 2-a

| | Resist composition | | | | | | | | | |
|---|---|---|---|---|---|---|---|---|---|---|
| | Substrate | | Polymerizable compound | | Polymerization initiator | | Fluorine-containing compound | | | |
| Ex./Comp. Ex. | Material | Surface treatment | Component | Viscosity mPa·s | Type | Solid content % by mass | (with high viscosity) | Solid content % by mass | Fluorine content % by mass | Viscosity mPa·s |
| Comp. Ex. 1 | Si | UV | 1-A | 20 | TPO-L | 2% | PF656 | 4.00% | 49% | 1,800 |
| Comp. Ex. 2 | Si | UV | 1-A | 20 | TPO-L | 2% | PF6320 | 0.10% | 37% | 5,500 |
| Comp. Ex. 3 | Si | UV | 1-A | 20 | TPO-L | 2% | PF6320 | 4.10% | 37% | 5,500 |
| Comp. Ex. 4 | Si | UV | 1-A | 20 | TPO-L | 2% | PF656 | 4.00% | 49% | 1,800 |
| Comp. Ex. 5 | Si | UV | 1-C | 20,000 | TPO-L | 2% | PF6320 | 0.10% | 37% | 5,500 |
| Comp. Ex. 6 | Si | UV | 1-A | 20 | TPO-L | 2% | PLURONIC L101 POE(8)/POP(55) | 0.10% | 42% | 7,000 |

TABLE 2-b

| | Resist composition | | | | | | Evaluation after formation of resist layer | | Imprinting process | | | |
|---|---|---|---|---|---|---|---|---|---|---|---|---|
| | Fluorine-containing compound | | | | Solvent | | Thickness | | Mold structure | | Imprinting condition | |
| Ex./Comp. Ex. | (with low viscosity) | Solid content % by mass | Fluorine content % by mass | Viscosity mPa·s | Type | Solid content concentration | Total nm | Fluorine layer nm | TP/Width/Depth nm | Taper angle | Pressing condition | Length of time for mold separation |
| Comp. Ex. 1 | Not used | — | — | — | PGMEA | 4% | 40 | 1.2 | 100/40/120 | 83° | r.t, 30 atm, 20 sec | 5 sec |
| Comp. Ex. 2 | Not used | — | — | — | PGMEA | 4% | 40 | <0.1 | 100/40/120 | 83° | r.t, 30 atm, 20 sec | 5 sec |
| Comp. Ex. 3 | Not used | — | — | — | PGMEA | 4% | 40 | 1.2 | 100/40/120 | 83° | r.t, 30 atm, 20 sec | 5 sec |
| Comp. Ex. 4 | ZONYL FSO-100 | 0.10% | 42% | 90 | PGMEA | 4% | 40 | 1.2 | 100/40/120 | 83° | r.t, 30 atm, 20 sec | 5 sec |
| Comp. Ex. 5 | PF656 | 4.00% | 49% | 1,800 | PGMEA | 4% | 40 | 1.2 | 100/40/120 | 83° | r.t, 30 atm, 20 sec | 5 sec |
| Comp. Ex. 6 | Not used | — | — | — | PGMEA | 4% | 40 | 0 | 100/40/120 | 83° | r.t, 30 atm, 20 sec | 5 sec |

In Tables above, "r.t" denotes room temperature.

<Measuring Method>

The following were measured in accordance with the explanations.

—Viscosity—

Regarding the viscosity, the viscosity at 25° C. was measured using ROTOVISCO RV1 (manufactured by Haake GmbH).

—Crosslink Density—

The crosslink density was defined as the value obtained by dividing the molecular weight of each of the polymerizable compounds used by the number of crosslinking groups. In the case of a mixture, the crosslink density was defined as the sum of values obtained by multiplying the calculated crosslink density/densities by the mass ratios of components mixed.

—Solid Content—

The solid content was defined as the mass ratio of each composition to the polymerizable compound.

—Fluorine Content—

The fluorine content was calculated by dividing the total mass of fluorine atoms by the molecular weight of each material, according to the structural formula of each material used.

—Solid Content Concentration—

The solid content concentration was calculated as the ratio of the total mass of materials other than a solvent to the total mass of a composition.

—Thickness—

—Resist Layer—

The thickness of the resist layer was measured using an ellipsometer (manufactured by MIKASA Co., Ltd.).

—Surface Layer Region Including Fluorine-containing Compound—

Specified as the depth (nm) from the surface, the thickness of a surface layer region (fluorine layer) which included 99% by mass or more of the fluorine-containing compounds composed of the fluorine-containing compound A and the fluorine-containing compound B was measured by a method using etching and ESCA as described above.

<Measuring Method>

The following were evaluated in accordance with the explanations.

—Coatability—

Evaluations of coatability were carried out as follows: the surface state of a resist layer formed using a spin coater and then baked was visually observed; further, another resist layer was formed as a model on a substrate and then UV-cured (at an irradiation amount of 200 mj/cm$^2$) with a N2 gas purge to obtain a sample, and the sample was microscopically observed using an optical microscope (L200D, manufactured by NIKON CORPORATION). The layer thickness distribution was evaluated based upon a distribution obtained by measuring the thickness of a resist layer at intervals of 10 mm from a central portion of the substrate to a portion of the substrate which lay 5 mm inside with respect to the outer diameter of the substrate, using an ellipsometer.

A: Depressions were not formed, and the layer thickness distribution was 4 nm or less.

B: A resist layer was formed; however, foreign matter able to be visually recognized or foreign matter able to be microscopically recognized was present to a great extent; or the layer thickness distribution was 10 nm or less.

C: Depressions were formed, thereby making it impossible to form a resist layer properly, or the layer thickness distribution was greater than 10 nm and so the layer thickness was nonuniform.

—Imprinting Quality—

Each pattern formation having undergone the imprinting was visually observed and also microscopically observed using an optical microscope, and evaluations were carried out in accordance with the following criteria.

A: Peeling did not occur.

B: Peeling occurred in regions occupying less than 5% by area of the patterned portion.

C: Peeling occurred in regions occupying 5% by area or more of the patterned portion.

—Minute Shape—

The mold pattern depth and the pattern height of each pattern formation having undergone the imprinting were evaluated using an AFM (NANOSCOPE V, manufactured by Veeco Instruments Inc.).

A: The ratio of the imprint pattern height to the mold pattern depth (i.e. imprint pattern height/mold pattern depth) was 90% or more.

B: The ratio of the imprint pattern height to the mold pattern depth (i.e. imprint pattern height/mold pattern depth) was 75% or more but less than 90%.

C: The ratio of the imprint pattern height to the mold pattern depth (i.e. imprint pattern height/mold pattern depth) was less than 75%; or peeling or tearing occurred.

—Uniformity of Residual Film—

With regard to the in-plane distribution of the residual film thickness (the thickness of a layer formed between the substrate and bottom/concave portions of the pattern) of each pattern formation having undergone the imprinting, a total of eight points were sampled at angular intervals of 90° on the inner and outer circumferential sides of the concentric pattern, then the residual film thicknesses at these eight points were calculated using an AFM (NANOSCOPE V, manufactured by Veeco Instruments Inc.), and evaluations were carried out defining the difference between the maximum value and the minimum value as "variation".

A: The variation was less than 5 nm.

B: The variation was 5 nm or more but less than 15 nm.

C: The variation was 15 nm or more.

—Pattern after Etching (Shape and Uniformity)—

With regard to the in-plane distribution of the pattern on the substrate after the substrate had been etched as described above using, as an etching resist, each pattern formation produced by the imprinting, a total of eight points were sampled at angular intervals of 90° on the inner and outer circumferential sides of the concentric pattern, and evaluations were carried out as follows: shapes (the height, the width, and the state of the upper surface of the pattern) seen in images observed using an SEM (manufactured by Hitachi, Ltd.) and an AFM (NANOSCOPE V, manufactured by Veeco Instruments Inc.) was evaluated.

A: The pattern height was 100 nm±5 nm or less, the height distribution 3σ was 3% or less of the pattern height, the upper surfaces of convex portions of the pattern were not sharp, and regions where the pattern was not formed did not exist.

B: The pattern height was 100 nm±5 nm or less, the height distribution 3σ was more than 3% but less than 6% of the pattern height, and the upper surfaces of convex portions of the pattern were not sharp, or regions where the pattern was not formed occupied less than 5% by area of the patterned portion.

C: The pattern height was 95 nm or less, or the height distribution 3σ was 6% or more of the pattern height, or the upper surfaces of convex portions of the pattern were sharp (without widths), or regions where the pattern was not formed occupied 5% by area or more of the patterned portion.

The symbol "σ" denotes the standard deviation of height. The standard deviation "σ" of height was calculated by measuring the pattern height at the sampled eight points, 10 times each, with an AFM, and using the 80 values of pattern height obtained.

The results of the evaluations carried out on Examples 1 to 15 and Comparative Examples 1 to 6 are shown in Table 3.

TABLE 3

| | Evaluation results | | | | |
|---|---|---|---|---|---|
| Ex./ Comp. Ex. | Coatability Depressions or foreign matter Uniformity of layer thickness | Imprinting quality Damage related to peeling Damage related to tearing | Minute shape | Uniformity of residual film | Pattern after etching (shape and uniformity) |
| Ex. 1 | A | A | A | A | A |
| Ex. 2 | A | A | A | A | A |
| Ex. 3 | A | A | A | A | A |
| Ex. 4 | A | B | A | A | A |
| Ex. 5 | A | B | A | A | A |
| Ex. 6 | A | A | A | A | A |
| Ex. 7 | A | B | A | A | A |
| Ex. 8 | A | A | A | A | A |
| Ex. 9 | A | A | A | A | A |
| Ex. 10 | A | A | A | A | A |
| Ex. 11 | A | A | A | A | A |
| Ex. 12 | B | A | A | A | B |
| Ex. 13 | B | A | A | A | B |
| Ex. 14 | A | A | A | A | A |
| Ex. 15 | A | A | A | A | A |
| Comp. Ex. 1 | C | A | A | C | C |
| Comp. Ex. 2 | A | C | C | C | C |
| Comp. Ex. 3 | A | C | C | C | C |
| Comp. Ex. 4 | C | A | A | C | C |
| Comp. Ex. 5 | A | A | C | C | C |
| Comp. Ex. 6 | A | C | C | C | C |

The resist composition of the present invention makes it possible to provide a resist composition, a resist layer, an imprinting method, a pattern formation and techniques related to these, that are capable of preventing, on the entire surface of a pattern formation, the occurrence of separation-related defects and pattern defects, making uniform a patterned shape and a residual film, and improving productivity by shortening the length of time for mold separation. Therefore, the resist composition can be widely utilized, for example for semiconductors, devices, hard disks and optical films.

What is claimed is:

1. A resist composition comprising:
   at least one polymerizable compound having a viscosity of 100 mPa·s or less at 25° C.;
   a fluorine-containing compound A having a viscosity of 5,000 mPa·s or greater at 25° C., and a fluorine content of 10% by mass or greater; and
   a fluorine-containing compound B having a viscosity of 2,000 mPa·s or less at 25° C., and a fluorine content of 10% by mass or greater,
   wherein the amount of the fluorine containing compound A is in a range of 0.0002% to 0.05% by mass with respect to the total amount of the resist composition,
   the amount of the fluorine-containing compound B is in a range of 0.05% to 0.4% by mass with respect to the total amount of the resist composition,
   the polymerizable compound comprises at least one compound selected from the group consisting of a photocurable resin composition, a thermosetting resin composition, and a thermoplastic resin composition, and
   the fluorine-containing compounds comprise at least one compound selected from the group consisting of fluorochemical surfactants and fluorine-silicone surfactants.

2. A resist layer, comprising a fluorine-containing compound A and a fluorine-containing compound B in a surface layer region of the resist layer which lies from a surface of the resist layer to a depth of 2.4 nm or less from the surface,
   wherein the resist layer is formed by applying a resist composition, the resist composition comprising:
   at least one polymerizable compound having a viscosity of 100 mPa·s or less at 25° C.;
   the fluorine-containing compound A having a viscosity of 5,000 mPa·s or greater at 25° C., and a fluorine content of 10% by mass or greater; and
   the fluorine-containing compound B having a viscosity of 2,000 mPa·s or less at 25° C., and a fluorine content of 10% by mass or greater,
   wherein the polymerizable compound comprises at least one compound selected from the group consisting of a photocurable resin composition, a thermosetting resin composition, and a thermoplastic resin composition, and
   the fluorine-containing compounds comprise at least one compound selected from the group consisting of fluorochemical surfactants and fluorine-silicone surfactants.

3. The resist layer according to claim 2, wherein the surface layer region lies from the surface of the resist layer to a depth of 0.5 nm to 2.0 nm from the surface.

4. The resist layer according to claim 2, wherein X and Y measured by a method using etching and ESCA satisfy the relationship $Y/X \geq 0.99$,
   where X denotes the total amount, expressed as % by mass, of the fluorine-containing compound A and the fluorine-containing compound B contained in the resist layer, and
   Y denotes the amount, expressed as % by mass, of the fluorine-containing compound A and the fluorine-containing compound B present in the surface layer region of the resist layer.

5. An imprinting method comprising pressing an imprint mold, which has a patterned shape, against the resist layer of claim 2.

6. A method for producing a magnetic recording medium, comprising:
forming the resist layer of claim 2 over a substrate;
pressing an imprint mold, which has a patterned shape, against the resist layer from the side of a surface layer region of the resist layer so as to imprint the resist layer with a resist pattern made by transferring the patterned shape as a template; and
performing etching, using as a mask the resist pattern formed by the imprinting, so as to form a pattern at a magnetic layer.

7. The resist composition according to claim 1, wherein the polymerizable compound comprises one or more of naphthylmethyl acrylate, 1,4-diacryloyloxymethylbenzene, and CN-benzylmethyl acrylate.

8. The resist composition according to claim 1, wherein the fluorine-containing compound A is the following:

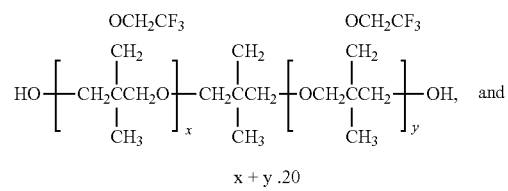

x + y .20 the fluorine-containing compound B is the following:

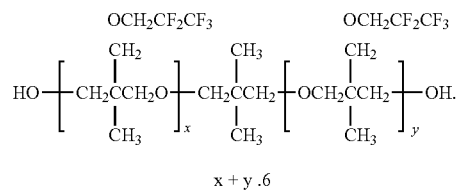

x + y .6

* * * * *

UNITED STATES PATENT AND TRADEMARK OFFICE
CERTIFICATE OF CORRECTION

| | |
|---|---|
| PATENT NO. | : 8,536,270 B2 |
| APPLICATION NO. | : 12/731308 |
| DATED | : September 17, 2013 |
| INVENTOR(S) | : Tadashi Omatsu |

It is certified that error appears in the above-identified patent and that said Letters Patent is hereby corrected as shown below:

Title Page

"(73) Assignee: FujiFilm, Tokyo (JP)"

should be replaced with

--(73) Assignee: FUJIFILM CORPORATION, Tokyo (JP)--.

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO.          : 8,536,270 B2
APPLICATION NO.     : 12/731308
DATED               : September 17, 2013
INVENTOR(S)         : Tadashi Omatsu It is certified that error appears in the above-identified patent and that said Letters Patent is hereby corrected as shown below:

On the Title page, left column, the line reading:

Item "(73) Assignee: FUJIFILM CORPORATION, Tokyo (JP)"

should be replaced with

--(73) Assignee: FUJIFILM Corporation, Tokyo (JP)--.

Signed and Sealed this
Twelfth Day of May, 2015

Michelle K. Lee
*Director of the United States Patent and Trademark Office*